United States Patent [19]

Weller

[11] Patent Number: 5,350,271
[45] Date of Patent: Sep. 27, 1994

[54] AUTOMOBILE LIFTING AND TOWING EQUIPMENT

[76] Inventor: Peter J. Weller, 2006 Curtis Ave., Redondo Beach, Calif. 90278

[21] Appl. No.: 816,177

[22] Filed: Jan. 2, 1992

[51] Int. Cl.⁵ .............................................. B60P 3/12
[52] U.S. Cl. .................................... 414/563; 280/402
[58] Field of Search ...................... 414/563, 426, 428; 280/402

[56] References Cited

U.S. PATENT DOCUMENTS

| | | | |
|---|---|---|---|
| 3,690,482 | 9/1972 | Gaumont | 414/563 |
| 3,924,763 | 12/1975 | Pigeon | 414/563 |
| 3,951,280 | 4/1976 | Peck | 414/563 |
| 4,264,262 | 4/1981 | LoCodo | 414/563 |
| 4,473,334 | 9/1984 | Brown | 414/563 |
| 4,564,207 | 1/1986 | Russ et al. | 414/563 |
| 4,634,337 | 1/1987 | Hamman | 414/563 |
| 4,637,623 | 1/1987 | Bubik | 414/563 X |
| 4,678,392 | 7/1987 | Capers et al. | 414/563 |
| 4,679,978 | 7/1987 | Holmes et al. | 414/563 |
| 4,737,066 | 4/1988 | Allison, Jr. | 414/563 |
| 4,797,057 | 1/1989 | Shoup et al. | 414/563 |
| 4,859,134 | 8/1989 | Lock | 414/563 |
| 4,875,269 | 10/1989 | Crist | 414/563 X |
| 4,948,327 | 8/1990 | Crupi, Jr. | 414/563 |

Primary Examiner—Michael S. Huppert
Assistant Examiner—James T. Eller, Jr.
Attorney, Agent, or Firm—Merchant, Gould, Smith, Edell, Welter & Schmidt

[57] ABSTRACT

A system for securing the wheels of a vehicle to be towed to the cross-arm of a wheel-lift tow truck. This system is operated automatically. In the retracted position, it is compact against the cross-arm. When extended, it provides an effective retention system for securing the wheels. It allows for the use of a telescopic stinger and therefore minimizes the detrimental effect of a rearwardly suspended load on the weight distribution of the tow truck, since it can be retracted as far as space will allow to bring the towed vehicle as close as possible to the tow truck. This wheel-lift cross-arm system can be used with any stinger configuration and can be used on combination tow trucks having both recovery booms/sling systems and wheel-lift systems. It can be retrofitted to tow trucks already in use and can be used as part of a conversion system for pickup trucks and other trucks with existing beds.

18 Claims, 12 Drawing Sheets

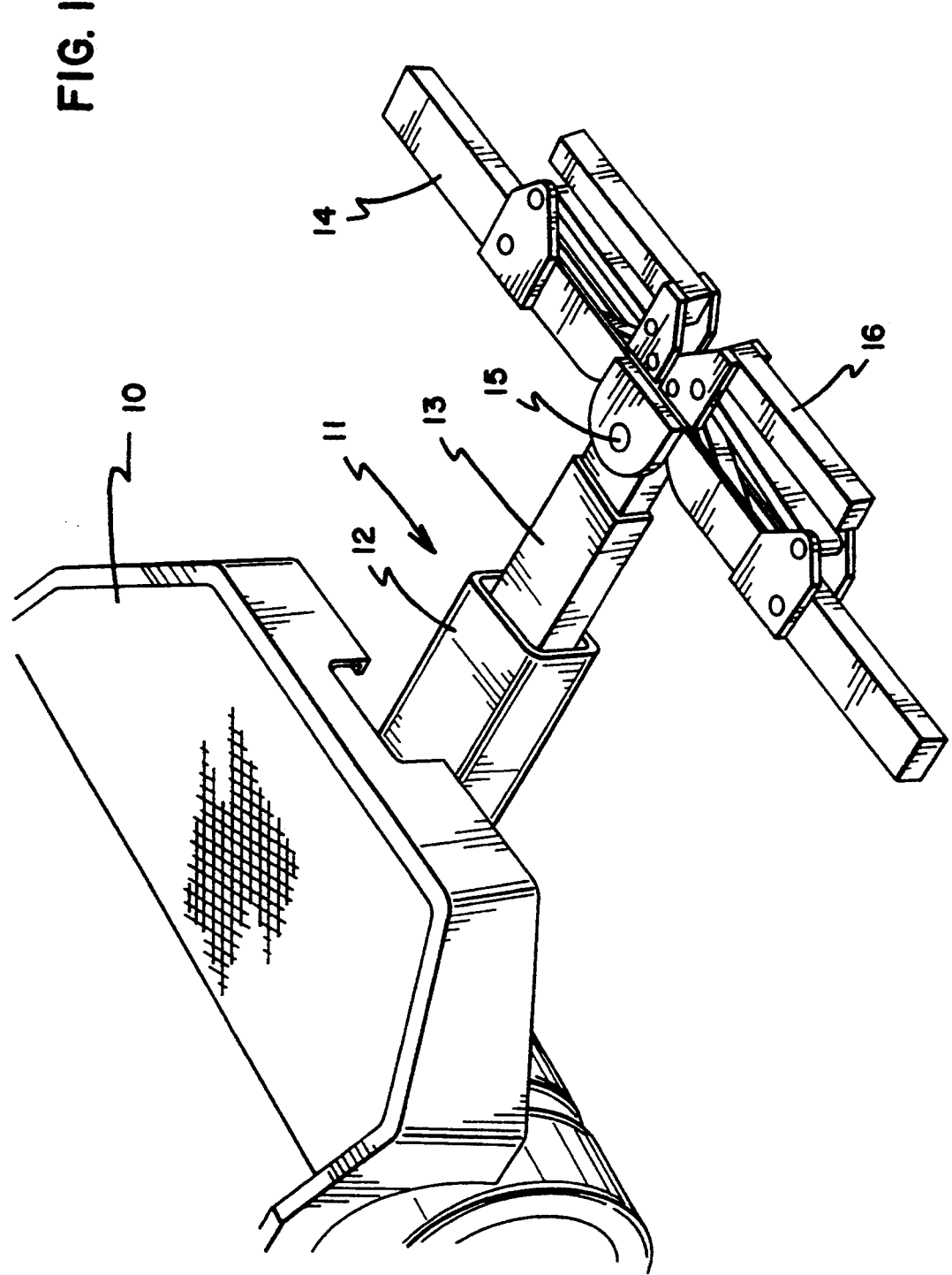

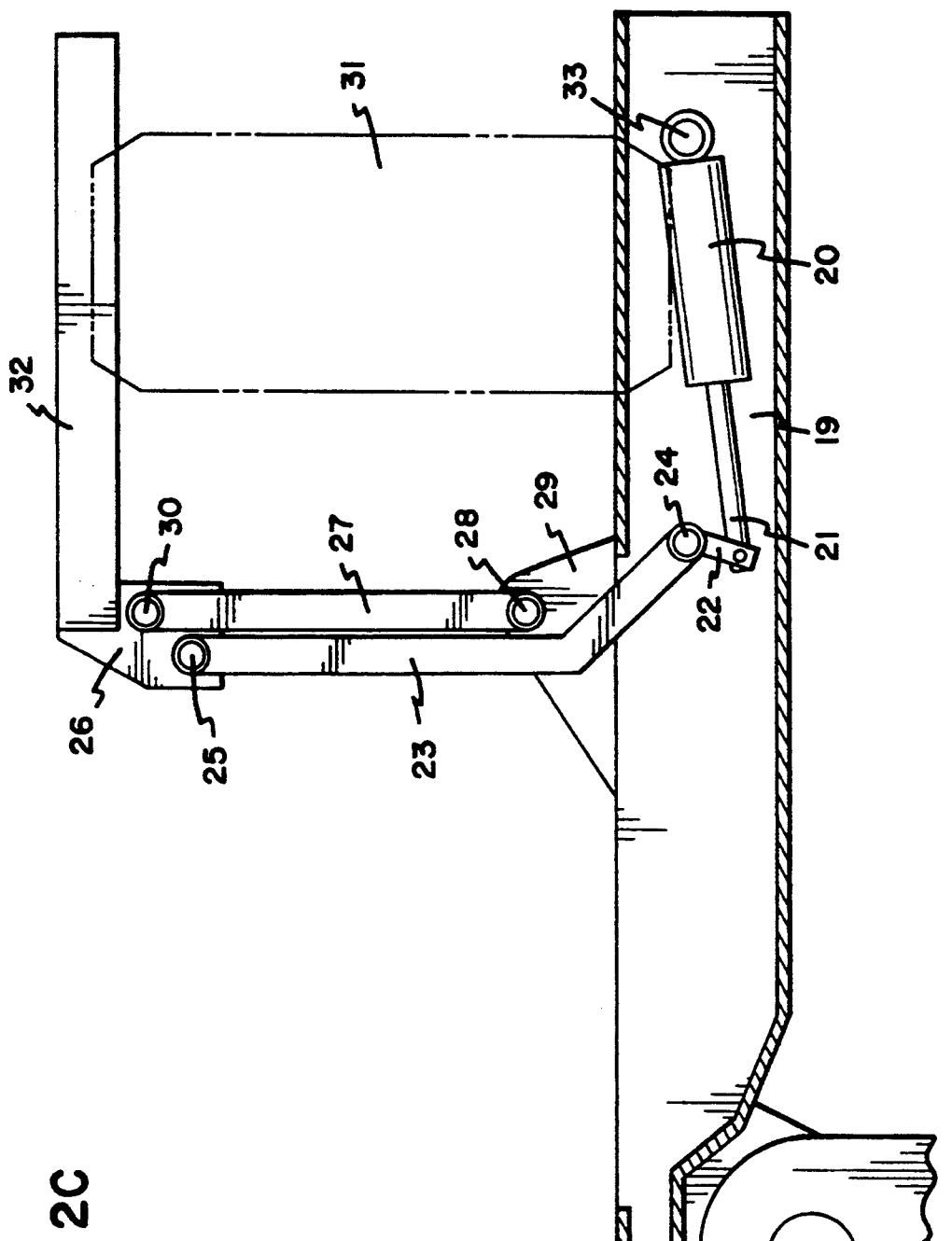

AUTOMOBILE LIFTING AND TOWING EQUIPMENT

BACKGROUND OF THE INVENTION

1. Field of the Invention

This invention relates in general to automobile lifting and towing equipment, and in particular to a system for securing the wheels of a vehicle to be towed to the cross-arm of a wheel-lift tow truck.

2. Description of Related Art

Until recently, tow trucks traditionally used a sling system to attach vehicles, lift them, and tow. The sling is suspended from a boom at the rear of the tow truck and stands off from the back plate of the tow truck body by means of arms which are pivotally connected to the backplate. The vehicle to be towed is typically attached to the sling by chains which are hooked onto the axle or frame of the vehicle and which are tensioned as the tow truck boom raises the sling and vehicle. The chains force the vehicle against the flexible members of the sling (typically a pair of rubber or nylon straps) and keep the vehicle suspended above the ground as it is towed.

Recent automotive design changes have included lowering of the automobile chassis and incorporation of low air dams and bumpers which are less rigid than the steel bumpers of earlier model years. These changes make towing newer vehicles with a sling system difficult to do without damaging the bumpers and air dams. As a result, new systems for attaching and towing vehicles which are based on securing the wheels of the towed vehicle to the tow truck have been developed by tow truck manufacturers. These are called wheel-lift towing systems.

Wheel-lift tow truck designs typically incorporate a telescoping or folding tube or "stinger", at the end of which a cross-arm is pivotally connected. When being positioned for towing a vehicle, the cross-arm is placed against the tread of the tires of the vehicle. The cross-arm may or may not have sliding extensions to make the cross-arm length adjustable to different track dimensions of towed vehicles. Wheel retainers, which are separate from the stinger/cross-arm system or which are pivotally connected to the cross-arm or cross-arm extensions, are secured to the cross-arm or cross-arm extensions manually to entrap the wheel so that the vehicle may be lifted by raising the stinger.

The typical wheel-lift system can be used as the sole system for lifting and towing on a tow truck, or it can be used in combination with a boom and sling system on a tow truck. The versatility of such combination tow trucks is useful to tow truck operators who need the ability for recovering vehicles which have gone off the road. The operator typically uses a winch system built into the boom assembly on combination units to pull the vehicle to be recovered up to a location near the tow truck so that it can be attached, lifted, and towed. Furthermore, a sling system is a preferred method for towing some types of vehicles (usually the heavier ones) when possible, since its use is less detrimental than the use of a wheel-lift system to the weight distribution of the tow truck when loaded with a given vehicle.

Wheel-lift designs have been further refined to incorporate the ability for the wheel-lift to be operated remotely. These refinements reduce the time and effort required for securing and lifting the towed vehicle. In one example disclosed in U.S. Pat. No. 4,473,334, issued Sep. 25, 1984 to Brown, claw-shaped wheel retainers are pivotally connected to the cross-arm, and the wheels of the towed vehicle are entrapped by extending the stinger and cross-arm toward the vehicle and allowing the wheels of the vehicle to cause the claws to pivot into the correct position for lifting and towing. This system has many disadvantages. It cannot conveniently be used in snowy climates, since the claws may not pivot freely when they come into contact with ice or snow near the wheels of the vehicle. The stinger must be folded rather than telescopically retracted into the tow truck body for storage, since the claws when in the stored position protrude too far to the rear of the tow truck. This makes it impossible for the claw wheel-lift system to be incorporated with a sling system on the same tow truck. It also requires the stinger system to be located well behind the axle of the tow truck, since the truck frame must be adequately strengthened with a cross-member between the axle and the folding stinger.

In another example disclosed in U.S. Pat. No. 4,564,207, issued Jan. 14, 1986, to Russ et al., L-shaped wheel retainers are pivotally connected to the cross-arm and are stored with the legs of the "L" together and extending back from the cross-arm in the same plane as the stinger and cross-arm. To load a vehicle, the cross-arm is placed against the tread of the tires to be lifted, with the legs of the "L" extending underneath the vehicle between the tires. The Ls are then pivoted into position behind the tires by means of hydraulic cylinders acting directly on the plate at the base of the Ls. This system suffers some of the same drawbacks as the prior example cited: it is difficult to use with a recovery boom and sling on the same truck, and it must be used with a folding stinger, since the Ls protrude too far behind the tow truck to keep the stinger in the horizontal or near-horizontal position while driving the tow truck without a load.

In another example disclosed in U.S. Pat. No. 4,678,392, issued Jul. 7, 1987, to Capers et al., the system solves the problem of the storage position by pivotally connecting L-shaped retainers in such a way that the L collapses against the cross-arm and the leg of the L extends forward from the cross-arm when in the stored position. However, the Ls must be pivoted manually, and the system, therefore, cannot be operated completely from a remote position.

SUMMARY OF THE INVENTION

To overcome the limitations in the prior art described above, and to overcome other limitations that will become apparent upon reading and understanding the present specification, the present invention discloses a system for securing the wheels of a vehicle to be towed to the cross-arm of a wheel-lift tow truck. In the retracted position, the system in a folded position nestled and is compact against the cross-arm. When extended, the system provides an effective retention system for securing the wheels. The system allows for the use of a telescopic stinger and therefore minimizes the detrimental effect of a rearwardly suspended load on the weight distribution of the tow truck, since it can be retracted as far as space will allow to bring the towed vehicle as close as possible to the tow truck. This wheel-lift cross-arm system can be used with any stinger configuration and can be used on combination tow trucks having both recovery booms/sling systems and wheel-lift systems. It can be retrofitted to tow trucks already in use and can be used as part of a conversion system for pickup trucks and other trucks with existing beds.

BRIEF DESCRIPTION OF THE DRAWINGS

Referring now to the drawings in which like reference numbers represent corresponding parts throughout:

FIG. 1 is a rear perspective view of a towing vehicle looking forwardly having a wheel-lift system partly extended with the wheel retainers retracted against the cross-arm in the stored position;

FIGS. 2A, 2B, and 2C are sectional plan views of the cross-arm showing the wheel retainers in three positions representing the extension of the retainers to secure the wheels of a vehicle to be towed;

DETAILED DESCRIPTION OF THE PREFERRED EMBODIMENT

Figure 2A:
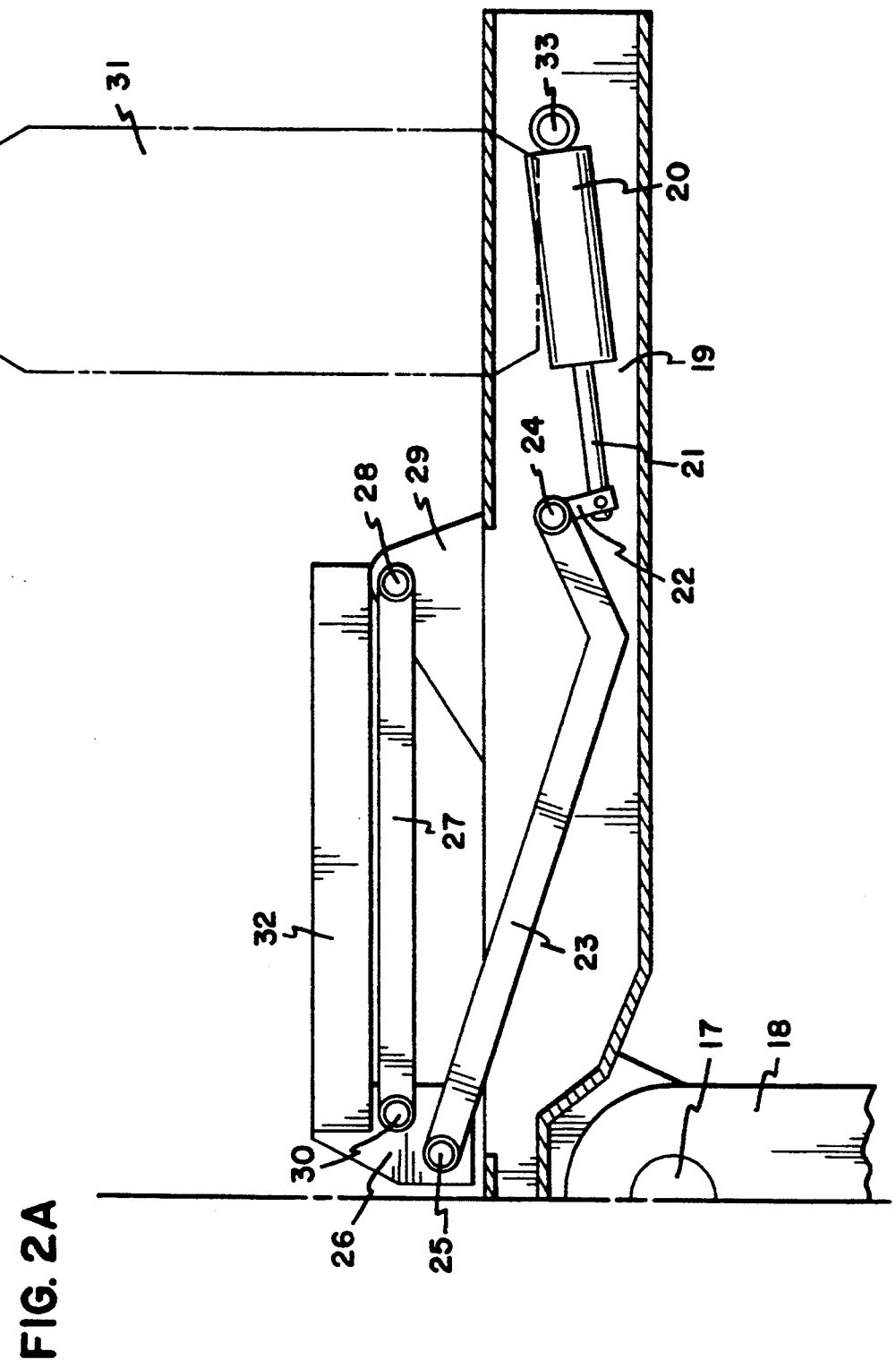

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Referring to the drawings, in FIG. 1, a tow truck 10 is shown having a wheel-lift system 11 for lifting and towing vehicles. The system illustrated consists of an outer stinger 12, an inner stinger 13, a cross-arm 14 which is pivotally connected to the inner stinger at 15, and a pair of wheel retainers 16 which are shown in a stored position. The two-stage telescopic stinger configuration 12 and 13 shown in FIG. 1 is for illustrating the assembly and operation of the cross-arm 14 and wheel retainer 16 system. This cross-arm 14 and wheel retainer 16 system can be used on any of several wheel-lift/stinger configurations and on virtually all systems already on the market, including telescopic stingers having more than two stages, stingers which fold against the tow truck 10 body rather than retract into the body, and stingers which are part of boom assemblies which are pivoted from a point on the tow truck 10 body.

Figure 2B:
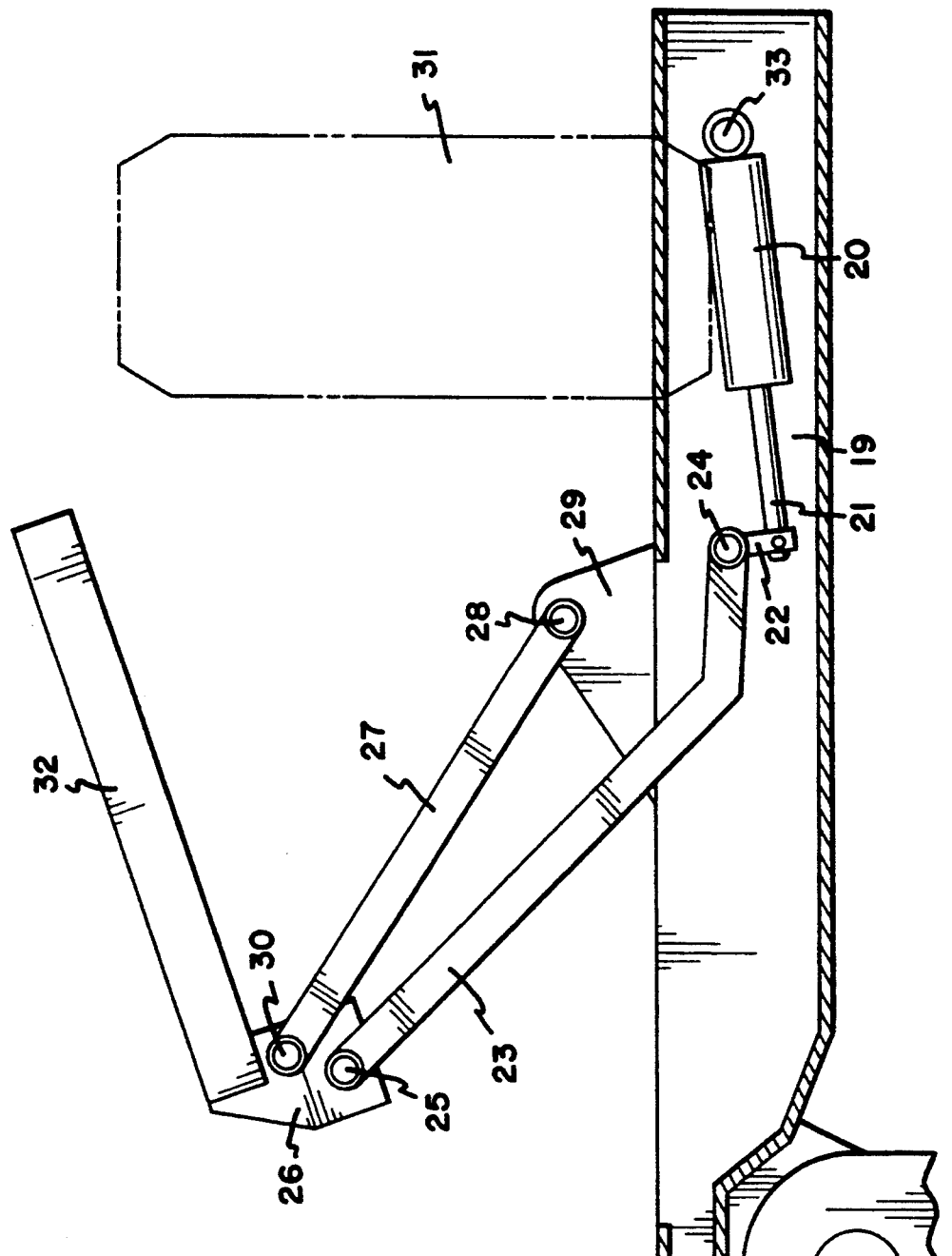

In FIGS. 2A, 2B, and 2C, the system is shown in three positions representing its action in securing a towed vehicle to the tow truck 10. The cross-arm 14 is pivotally connected 17 to the last stage 18 of the stinger 13. The cross-arm tube 19 contains hydraulic cylinders 20 for actuating the wheel retainer 16 system which are attached pivotally 33 to the cross-arm tube 19. The hydraulically extending rod 21 of each cylinder 20 is attached to a crank arm 22 which is part of the forward link 23 of the wheel retainer 16 system. This link 23 is pinned to the cross-arm tube 19 at the outer end 24 and pinned to a plate 26 at the inner end 25. The aft link 27 of the retainer system is pinned 28 to an extension 29 of the cross-arm tube 19 at the outer end 24 and pinned 30 to the same plate 26 as the forward link 23 at the inner end 25. This plate 26 is part of a weldment which includes the rear retainer bar 32 of the wheel retainer 16 system.

Figure 3:
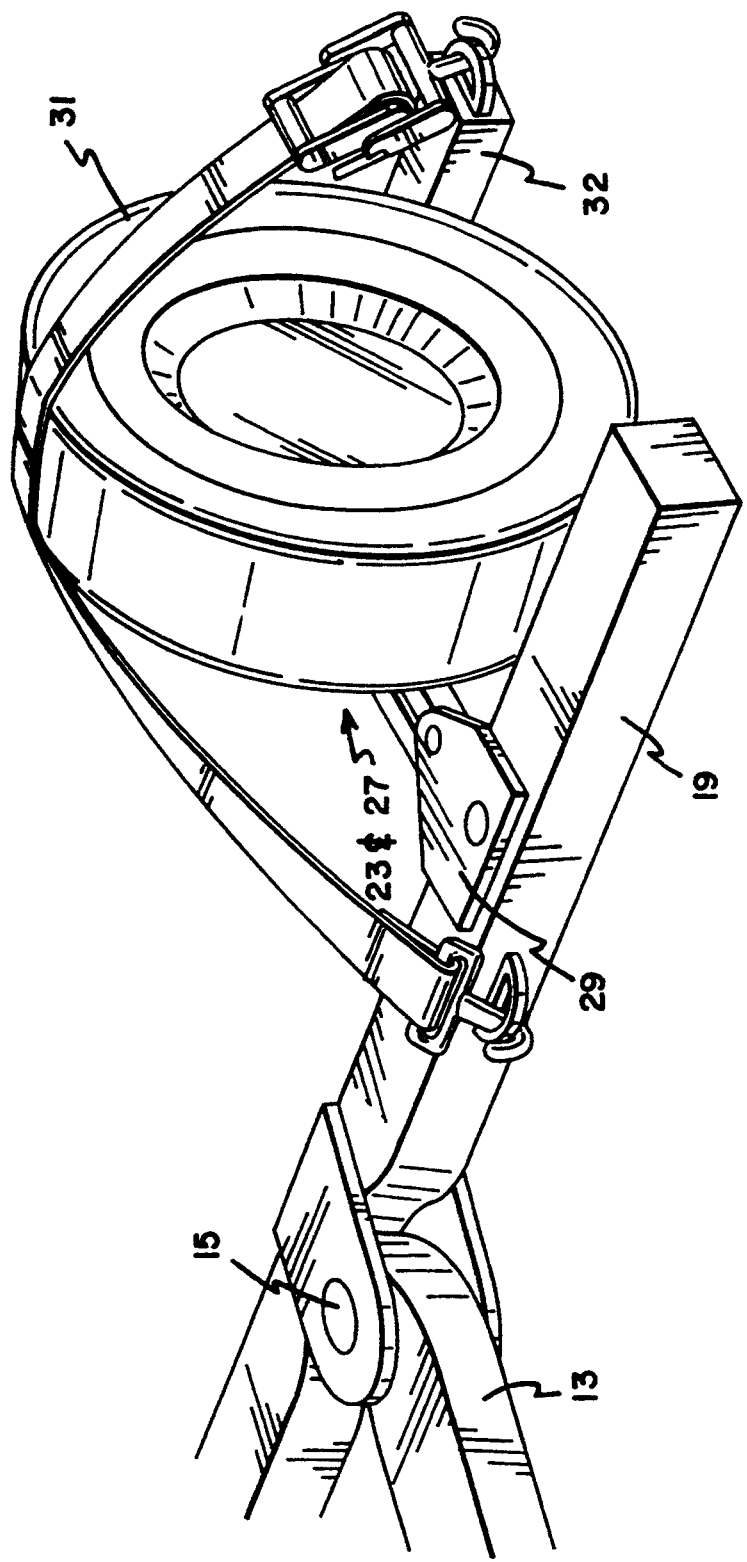
FIG. 3 shows one means of securing the tires of the towed vehicle to the cross-arm wherein straps made of nylon or similar material are attached to the cross-arm and the tip of the L shaped retainer by means of hooks, and the strap is ratcheted until tight.

When the cross-arm 14 system is used, it is first brought into contact with the tread of the tire 31 of the vehicle which is to be lifted and towed. The rod 21 of the hydraulic cylinder 20 is then extended, and this causes the forward link 23 to rotate about its end 24. End 25 is then caused to rotate in a circular path away from the cross-arm tube 19. As end 25 rotates, the rear retainer bar 32 moves away from the cross-arm tube 19, since it is pinned to the inner end 25 of the forward link 23. The aft link 27, being pinned to both the cross-arm tube 19 and the rear retainer bar 32, constrains the motion of the rear retainer bar 32 in such a way that the outer end 24 of the rear retainer bar 32 swings away from the tire 31 of the vehicle and then becomes positioned behind the tire 31. The motion of the rear retainer bar 32 is complete when the forward link 23 and aft link are in contact along their lateral surfaces. The rear retainer bar 32 is positioned parallel to the cross-arm tube 19 by the pressure in the cylinder 20, and its position can be further secured by using a tiedown strap (shown in FIG. 3) or tiedown basket assembly to run from a point on the cross-arm tube 19 across the tire 31 to the outer end 24 of the rear retainer bar 32. This tiedown strap also secures the tire 31 into the wheel retainer system.

One of the weaknesses of other cross-arm designs having hydraulic cylinders in them is that the hydraulic lines delivering pressurized hydraulic fluid to these cylinders from the control valve on the tow truck, whether they are hoses or steel tubing or a combination of both, are exposed for much of their length to possible damage during operation of the tow truck. This damage can take the form of abrasion from other parts of the wheel-lift system such as the stinger, the pivot pin, pivot plates, guide tubes for the hydraulic hose, or the cross-arm itself. It can also result from the hose being impacted or caught on other objects as the tow truck is driven or used to lift a vehicle, especially since the lines are usually strung along the outside of the stingers to the underside of the tow truck body.

Figure 4:
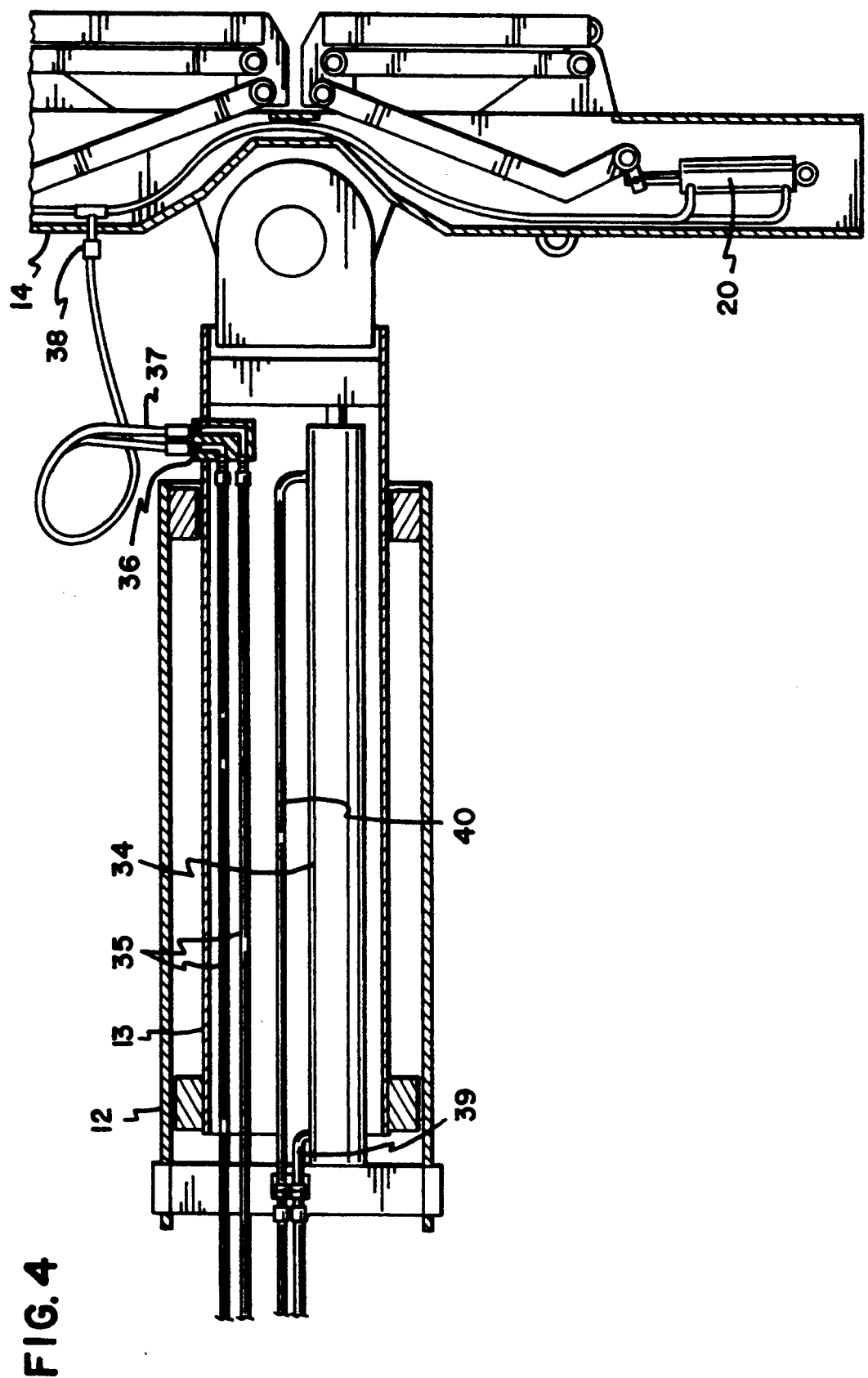
FIG. 4 shows a means of feeding the hydraulic lines for the cross-arm through the two-stage stinger in such a way that they are protected against abrasion and insult during operation of the tow truck.

FIG. 4, consisting of a cross sectional view of the outer stinger 12 and inner stinger 13 viewed from above, illustrates a method for protecting hydraulic lines. The cross-arm 14 contains cylinder 20 which controls the wheel retainers 16. The cylinder 34 acts to extend and retract the inner stinger 13 telescopically, while the outer stinger 12 is in this respect stationary. The hydraulic lines 35 provide hydraulic pressure to the cross-arm cylinders 20. These lines 35 are positioned inside the inner stinger 13 and are fixed to this stinger 13. They are attached to a bulkhead manifold 36 which provides a feedthrough to flexible hydraulic hose assemblies 37, which are in turn connected to bulkhead fittings 38 on the cross-arm 14. When the inner stinger 13 is extended, it pulls excess takeup hose 35 from outside the inner/outer stinger assemblies 12 and 13 into the outer stinger 12, and then pushes the takeup hose 35 back out when it is retracted back into the outer stinger 12. The lines 35 therefore remain protected throughout their travel, except for the hose 35 external to the assemblies and under the body of the tow truck 10, and the short length of hose 37 to the cross-arm 14, both of which are located in areas where damage is not likely. The extension cylinder 34 may be located off-center in the stinger assembly to permit the cross-arm 14 hydraulic lines 35 and the lines 39 and 40 to the extension cylinder 34 sufficient space to avoid internal abrasion while maintaining the most compact outer dimensions possible. The feature may be used on two-stage stingers such as the one shown in FIG. 4, and it may be used on stingers having three or more stages.

Figure 5:
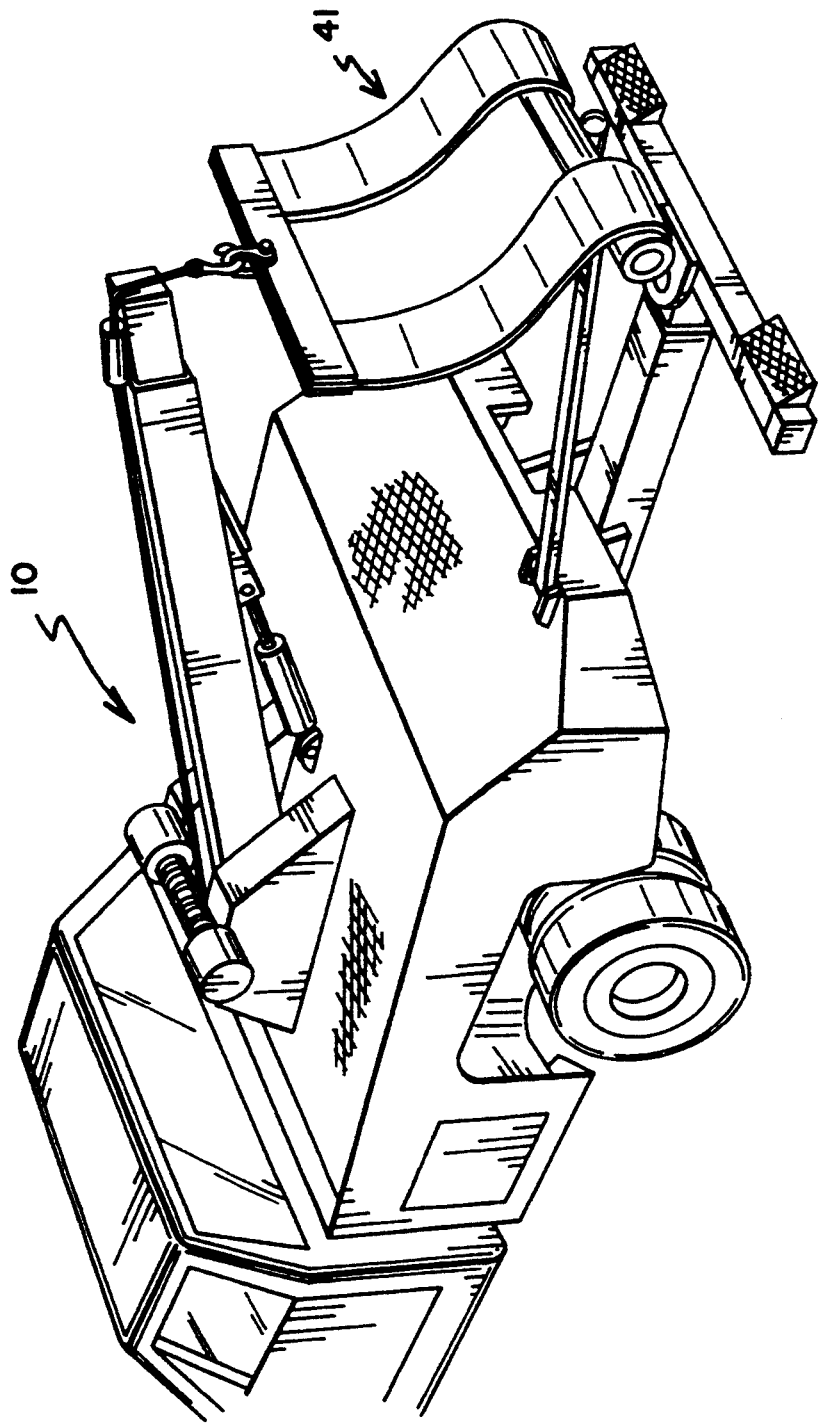
FIG. 5 is provided for describing a traditional arrangement of wheel-lift system, boom, and sling for tow trucks as way of explaining the feature presented in FIG. 6.

FIG. 5 shows a traditional form of sling 41 in use today. Tow slings 41 are a traditional means of attaching vehicles to a tow truck 10 boom and lifting and towing them. Although there is a much higher potential for damaging vehicles with plastic and fiberglass bumpers and air dams, a sling 41 has some advantages over a wheel-lift and is preferred by some operators for situations in which damage is not likely. The sling 41 can be faster to engage than a wheel-lift system and it puts less load on the rear axle of the tow truck 10 and removes less weight from the front axle of the tow truck 10 than a wheel-lift for a given towed vehicle.

When the tow truck 10 also has a wheel-lift system, use of one system involves interference from the apparatus of the other system, and usually requires that the system not in use be moved or folded away. This is a cumbersome process.

Figure 6:
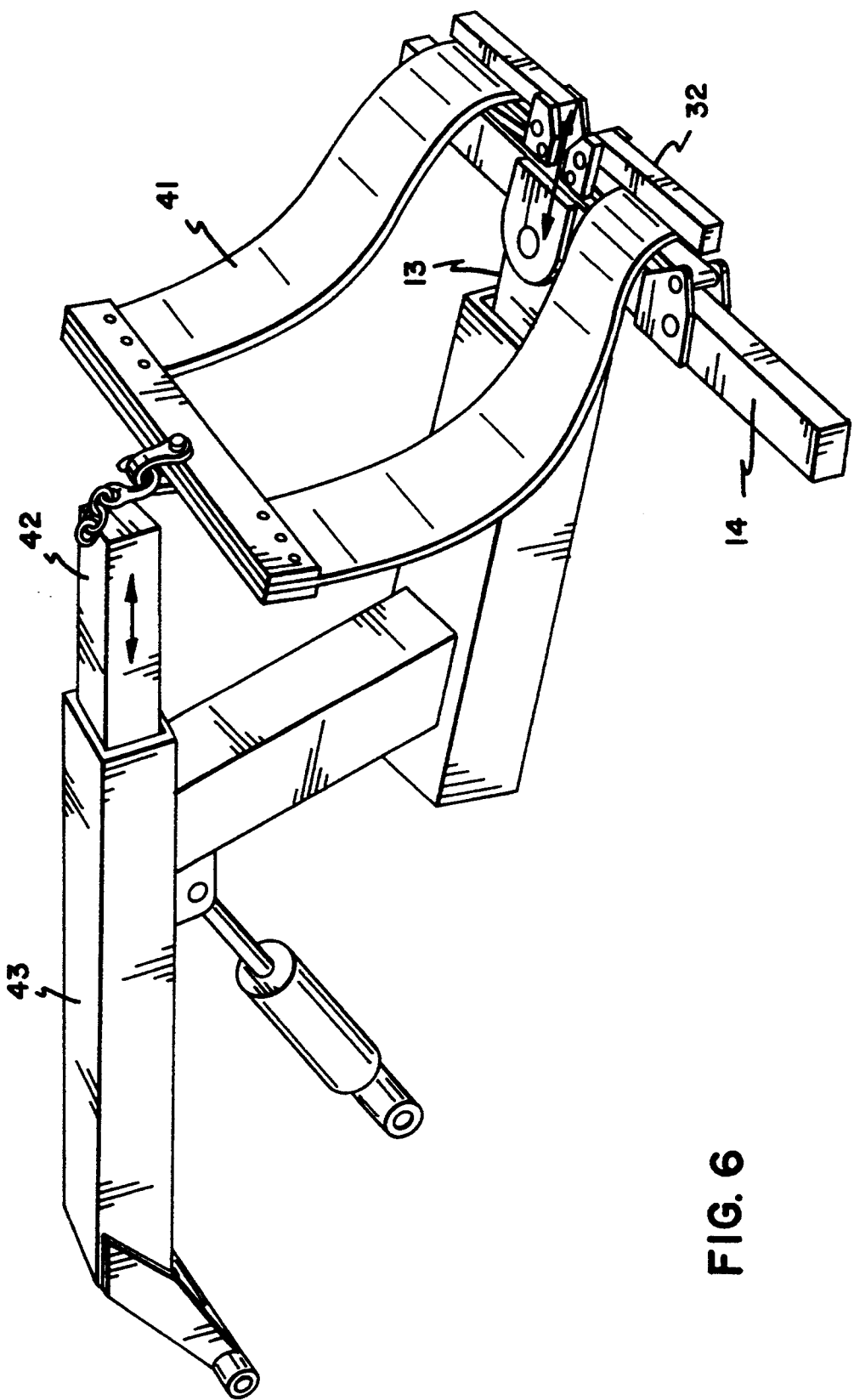
FIG. 6 shows a means of providing a sling on tow trucks with a wheel-lift by allowing the cross-arm of the wheel-lift system to act as the lower bar for the sling.

FIG. 6 illustrates sling 41 which utilizes the wheel-lift cross-arm as a lower sling bar. The sling 41 is extended and tensioned by adjusting the extension of the upper inner boom 42 either manually or hydraulically and of the wheel-lift inner stinger 13. Chains fasten the towed vehicle to the cross-arm 14 just as in the traditional sling, and the vehicle is raised by raising the wheel-lift boom 43. FIG. 6 shows the use of a combination sling 41 on an integrated boom system which is pivoted from a point on the body of the tow truck 10. However, the combination sling 41 could also be used on a tow truck 10 that has a separate recovery boom and wheel-lift system. For either application, storing the sling 41 is much easier than storing a traditional sling because there are no separate lower bar and no sling arms. The sling 41 straps are simply removed from the cross-arm 14 and stored by temporarily hooking them on the upper clamp plates or laying them on the body of the tow truck 10.

Figure 7:
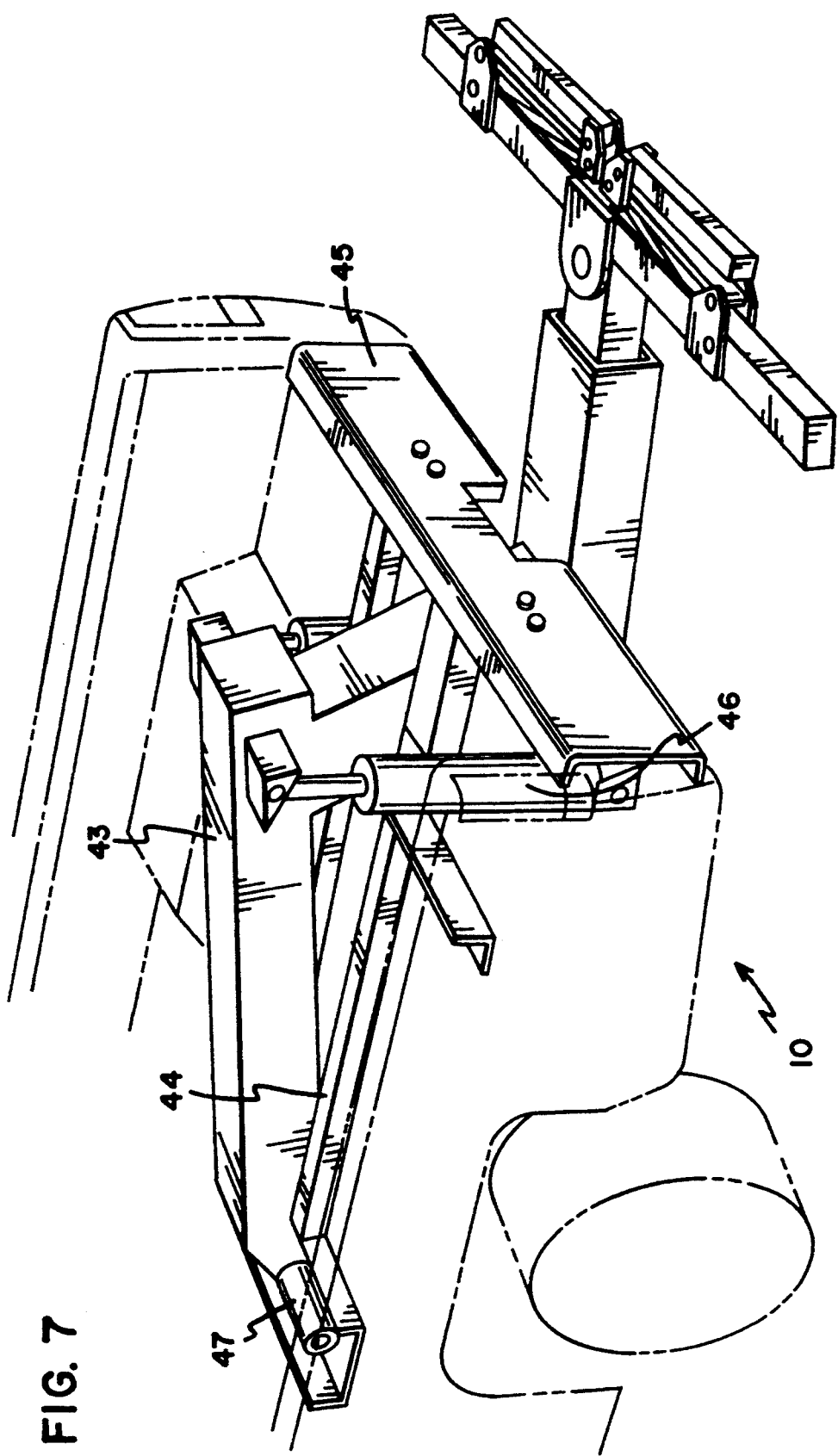
FIG. 7 is a version of the wheel-lift system which can be used to convert a pickup truck or other truck with an existing bed to a tow truck.

FIG. 7 illustrates a version of this wheel-lift system which may be installed on a pickup truck or any other truck of suitable capacity having an existing bed to convert it into a tow truck 10 without discarding the original truck bed. A frame consisting of formed plates 44, a back plate 45, cylinder supports 46, and pivot assembly 47 is bolted through the floor of the pickup box to the frame of the truck 10 and to the rear ends of the truck frame at the backplate 45 of the frame. The vertical leg of the cylinder support 46 fit through the box of the pickup by means of a cutout made in the box prior to mounting the frame. When this cutout is made, it will usually be necessary to cut out or remove one or more cross-members from the truck frame. The back plate 45, when bolted or welded to the ends of the truck frame, serves to replace these cross-members and to maintain the structural integrity of the truck. The wheel-lift system operates in the same way as described above, and other features of the pickup version may be the same as those described above.

Figure 8:
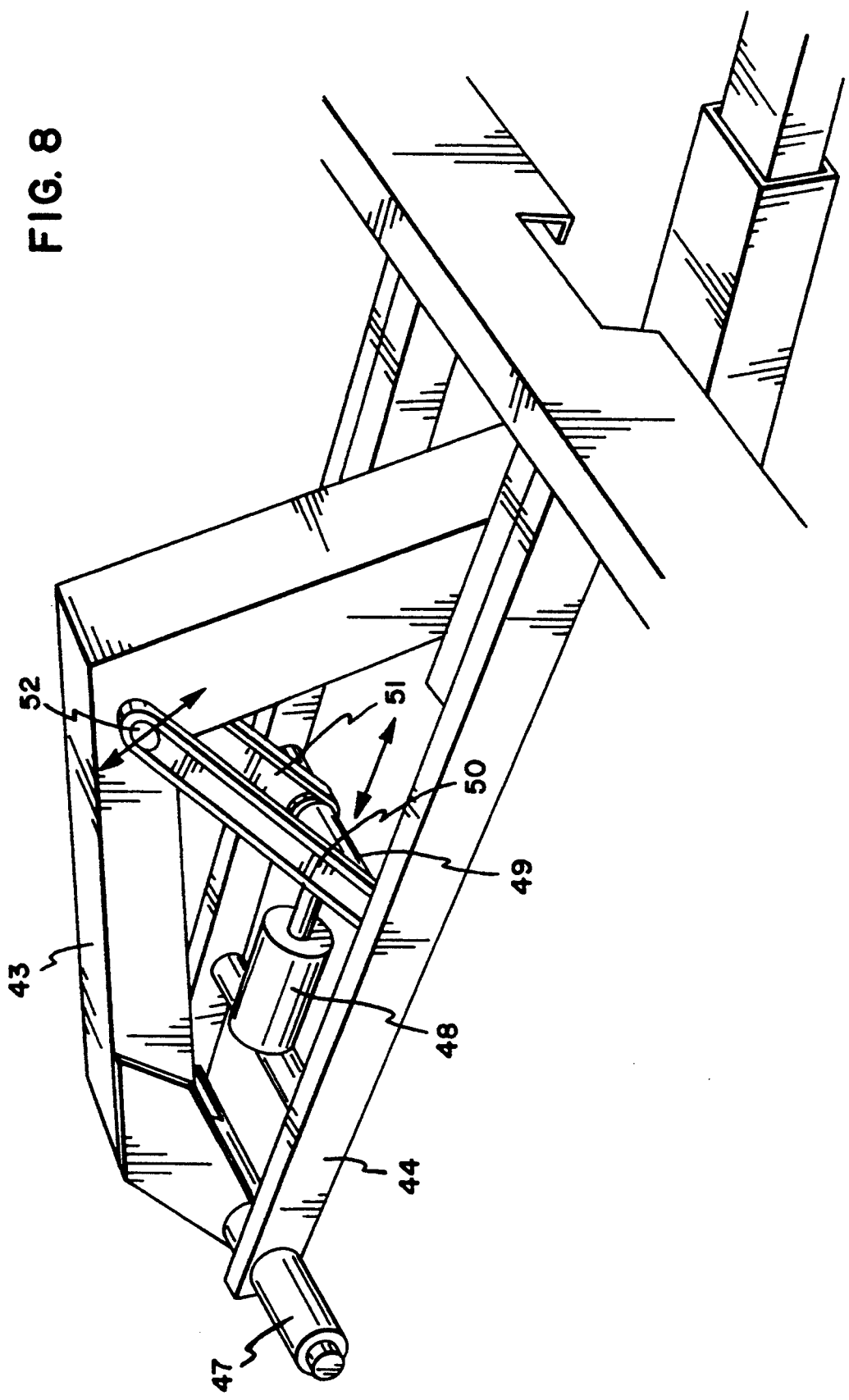
FIG. 8 shows a version of the wheel-lift system having an integrated boom which is raised by means of elevation links which allow the power means (hydraulic cylinder or other) to be mounted horizontally.

FIG. 8 illustrates another version of the wheel-lift system. In this version, the means of raising the boom 43 is a hydraulic cylinder 48 mounted horizontally rather than vertically as in FIG. 7. The cylinder 48 rod end is connected to a pin 49 which also goes through one end of each of two elevation links, 50 and 51. The pin 49 is constrained to move only in a direction parallel to axis of the frame members 44 of the wheel-lift system, thereby confining the position of the cylinder 48 axis to be horizontal at all times. This is accomplished by means of rollers or sliding blocks at either end of pin 49 which roll or slide inside the tubes 44 making up the frame of the system. The upper ends of the elevation links 50 and 51 are pinned 52 to the boom 43 assembly. The resultant motion is that the boom 43 rotates upward about the pivot assembly 47 when the elevation cylinder 48 is extended. Conversely, when the cylinder 48 is retracted, the boom 43 is lowered. The benefit of this configuration compared to a more traditional configuration in which one or more elevation cylinders 48 are positioned vertically and connected pivotally to the boom 43 assembly is that less of the bed of a truck must be cut out, since the cutout areas must only be large enough for allowing the boom 43 to pass through, not the boom 43 and cylinder(s) 48. Such a configuration will also reduce the amount and complexity of hydraulic lines, if the source of hydraulic pressure and control are located near the boom pivot assembly 47.

Figure 9:
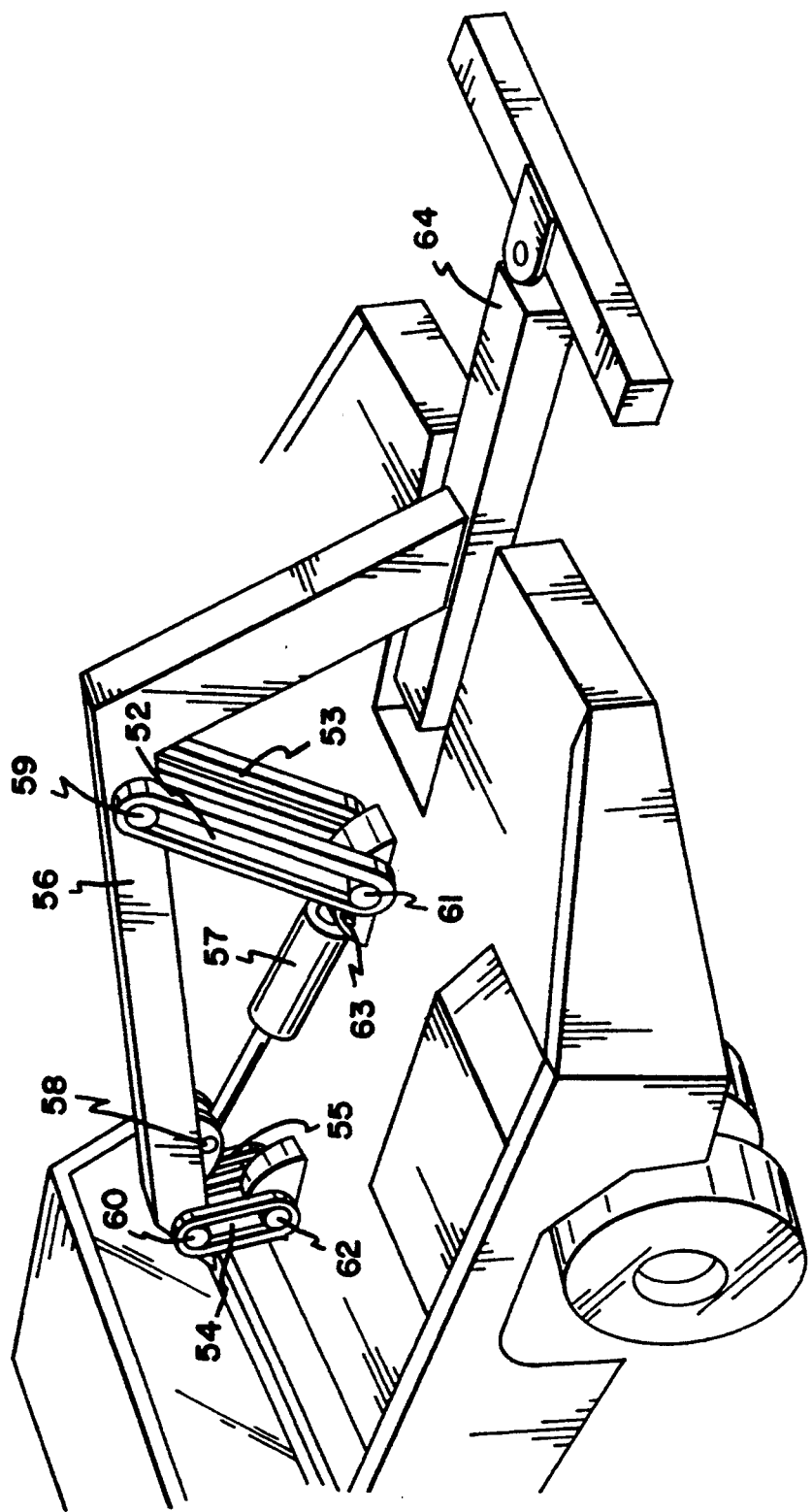
FIG. 9 shows another version of the integrated boom raised by means of two pairs of elevation links which constrain the boom to move forward as it is raised and backward as it is lowered.

FIG. 9 illustrates another configuration similar to the version in FIG. 8. In this configuration, the boom 56 is supported and constrained by two pairs of link arms, one pair at the rear (52 and 53) and one pair at the front (54 and 55) of the boom 56. A hydraulic cylinder 57 or other power means raises the boom 56 by applying force at a pivotal connection 58. The rear and front link arms 52, 53, 54 and 55, are pivotally connected to the boom 56 at pins 59 and 60, respectively, and are connected to the bed of the tow truck at pins 61 and 62, respectively. The hydraulic cylinder 57 is pivotally connected to the bed of the truck at pin 63. As the cylinder 57 is extended, the boom 56 and wheel-lift stinger assembly 64 moves upward and toward the front of the tow truck. When the cylinder 57 is retracted, the boom 56 and wheel-lift assembly 64 moves down and toward the rear.

Figures 10A, 10B:
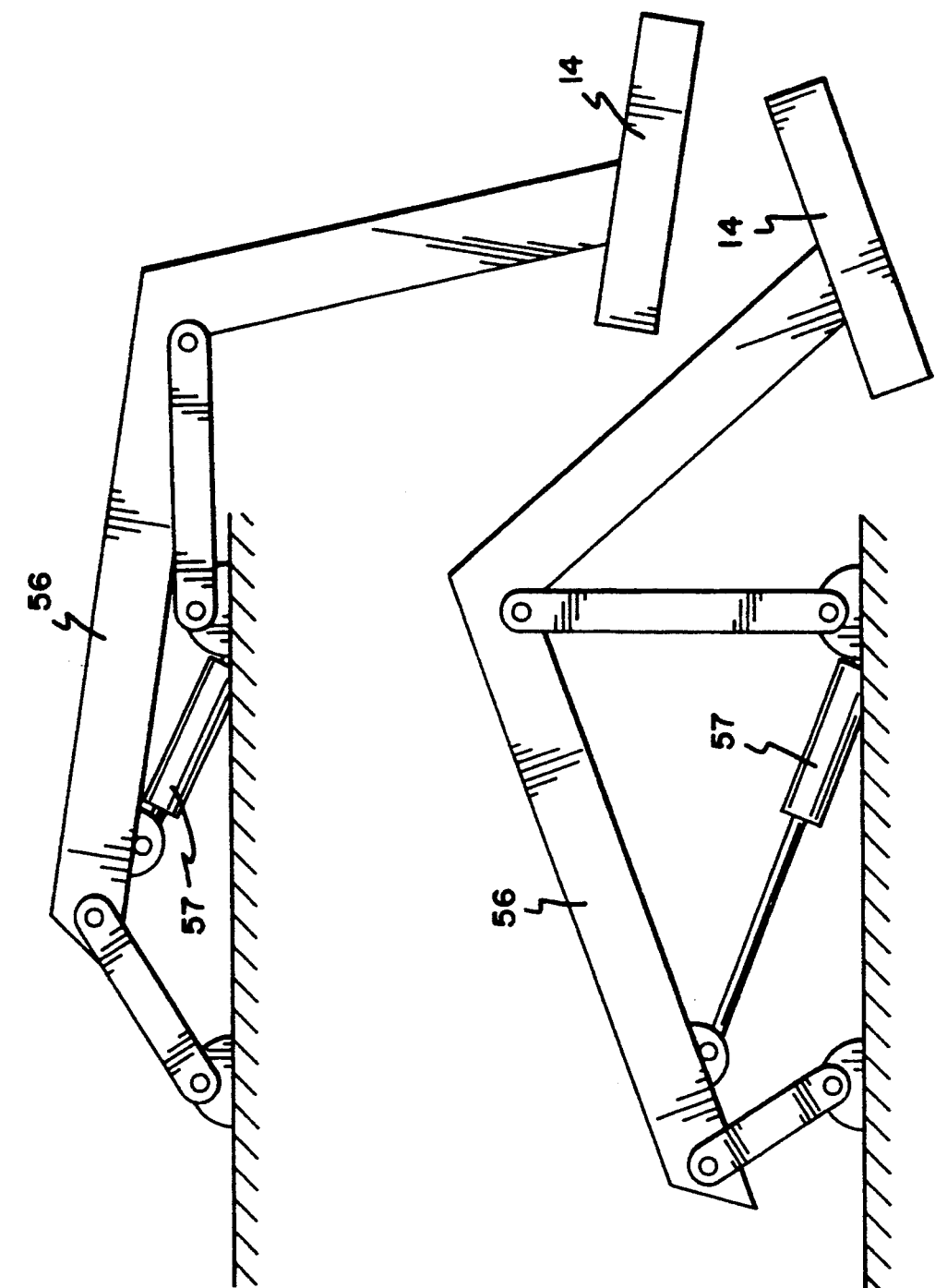
FIGS. 10A and 10B are further representations of the boom configuration shown in FIG. 9 which illustrates the position of the boom when lowered (FIG. 10A) and when raised (FIG. 10B).

FIGS. 10A and 10B further illustrates the motion described by FIG. 9, wherein FIG. 10A shows the boom 56 in its lowered position with the cylinder 57 retracted and FIG. 10B shows the boom 56 in its elevated position with the cylinder 57 extended. This configuration has the same advantage as the configuration in FIG. 8, in that the floor of the tow truck does not have to be cut out for a vertically mounted cylinder 57.

It has the additional advantage that the wheel-lift cross-arm 14 moves closer to the tow truck body when it is raised and is, therefore, in a better position for storage between tows or for carrying a vehicle in tow. Similarly, when the boom 56 is lowered, its motion rearward is an advantage, since the cross-arm 14 must be extended to meet the tires of the vehicle to be towed, anyway, and part of the motion may be supplied with the boom elevation mechanism in this configuration. Such a boom 56 configuration, for a given stinger configuration, will allow the cross-arm 14 to be stored closer to the tow truck body and will allow further extension of the cross-arm 14, two significant advantages for a wheel-lift tow truck. This configuration may be used in either a wrecker body tow truck or a pickup truck tow truck conversion unit.

In summary, a system for securing the wheels of a vehicle to be towed to the cross-arm of a wheel-lift tow truck has been described. In the retracted position, it is compact against the cross-arm. When extended, it provides an effective retention system for securing the wheels. It allows for the use of a telescopic stinger and therefore minimizes the detrimental effect of a rearwardly suspended load on the weight distribution of the tow truck, since it can be retracted as far as space will allow to bring the towed vehicle as close as possible to the tow truck. This wheel-lift cross-arm system can be used with any stinger configuration and can be used on combination tow trucks having both recovery booms/sling systems and wheel-lift systems. It can be retrofitted to tow trucks already in use and can be used as part of a conversion system for pickup trucks and other trucks with existing beds.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An automotive vehicle lifting and towing apparatus for a tow truck, comprising:
   (a) a rearwardly extending boom;
   (b) means, coupled to the boom, for positioning the boom near the ground to lift a vehicle;
   (c) a cross-arm pivotally connected to the boom;
   (d) one or more wheel retainers for lifting the vehicle, wherein the wheel retainers are coupled to the cross-arm using link means attached at pivot points on both the wheel retainers and the cross-arm by pins about which the link means may rotate; and
   (e) power means for extending and retracting the wheel retainers by rotating the link means about the pivot points, so that the wheel retainers and the wheel retainer pivot points swing in an arc when being extended that prevents the wheel retainers from entering a space occupied by the vehicle's tires, wherein the wheel retainers when extended are substantially parallel tot he cross-arm and positioned behind the vehicle's tires at a distance from the cross-arm so that the vehicle's tires are retained therebetween, wherein the wheel retainers when retracted are in a folded position substantially parallel to and nestled compactly against and adjacent the cross-arm, and wherein the wheel retainers are in substantially the same parallel orientation with respect to the cross-arm when in both the extended and retracted positions.

2. The invention as set forth in claim 1, wherein the wheel retainers are comprised of substantially straight bars.

3. The invention as set forth in claim 1, wherein the power means comprises one or more hydraulic cylinders coupled to the cross-arm for applying force to the link means.

4. The invention as set forth in claim 3, wherein the boom is comprised of a stinger having one or more stages and hydraulic hoses for providing hydraulic pressure to the cylinders, wherein the hydraulic hoses are located within the stinger so that they move with the stinger, and wherein the hydraulic hoses are attached to a bulkhead in the stinger which allows connection to the cross-arm.

5. The invention as set forth in claim 1, wherein the boom is comprised of a stinger having one or more stages.

6. The invention as set forth in claim 5, further comprising means for retracting the stinger for storage.

7. The invention as set forth in claim 5, further comprising means for pivotally attaching the stinger to the tow truck.

8. The invention as set forth in claim 5, further comprising means for attaching the boom to the tow truck so that the boom arcs vertically when force is applied thereto.

9. The invention as set forth in claim 8, further comprising means for applying force to the boom by activating one or more hydraulic cylinders mounted in a vertical orientation and pivotally connected to the boom to apply the force thereto in a substantially vertical direction.

10. The invention as set forth in claim 8, further comprising means for applying force to the boom by activating one or more hydraulic cylinders mounted in a horizontal orientation and pivotally connected to the boom, the hydraulic cylinders acting on one or more links connected to the boom, the links having lower ends which are constrained to move linearly and horizontally when force is applied thereto, and the links having upper ends which are pivotally attached to the boom so that the links translate the horizontal motion of the hydraulic cylinders to radial motion of the boom about the pivotal connection.

11. The invention as set forth in claim 5, further comprising means for mounting the boom on a frame assembly having horizontal members that reinforce a truck's frame, and means for mounting actuators substantially vertically between the truck's frame and the boom so that the frame assembly can be mounted on the truck's bed by cutting out part of the truck's bed to allow the boom to pass therethrough to place the stinger close to the ground when the boom is rotated downward by the actuators.

12. The invention as set forth in claim 5, further comprising means for horizontally mounting one or more actuators so that they are pivotally connected to the boom, the actuators acting on one or more links connected to the boom, the links having lower ends which are constrained to move linearly and horizontally when force is applied thereto, and the links having upper ends which are pivotally attached to the boom, so that the links translate the horizontal motion of the actuators to rotational motion of the boom about the pivotal connection.

13. The invention as set forth in claim 5, further comprising means for pivotally connecting the boom to the truck's bed at two points using link arms, so that actuators force the boom to pivot upward and forward when a positive force is applied thereto, and the actuators force the boom to pivot downward and rearward when a negative force is applied thereto.

14. The invention as set forth in claim 1, further comprising at least two flexible straps secured between an extendable member at an upper end of the boom and the cross-arm, so that the straps can lift the vehicle by being positioned against the front of the vehicle, by securing the vehicle to the cross-arm, and by raising the boom to lift the vehicle.

15. The invention as set forth in claim 1, further comprising at least two flexible straps secured between a second boom and the cross-arm, so that the straps can lift the vehicle by being positioned against the front of the vehicle, by securing the vehicle to the cross-arm, and by raising the boom to lift the vehicle.

16. The automotive vehicle lifting and towing apparatus of claim 1, further comprising means for pivotally connecting the boom to the truck's bed at two points using link arms, so that actuators force the boom to pivot upward and forward when a positive force is applied thereto, and the actuators force the boom to pivot downward and rearward when a negative force is applied thereto.

17. The automotive vehicle lifting and towing apparatus of claim 1, further comprising means for horizontally mounting one or more actuators so that they are pivotally connected to the boom, the actuators acting on one or more links connected to the boom, the links having lower ends which are constrained to move linearly and horizontally when force is applied thereto, and the links having upper ends which are pivotally attached to the boom, so that the links translate the horizontal motion of the actuators to rotational motion of the boom about the pivotal connection.

18. An automotive vehicle lifting and towing apparatus for a tow truck having a boom and a cross-arm pivotally connected to the boom, the apparatus comprising:

(a) one or more wheel retainers for lifting the vehicle, the wheel retainers being coupled to the cross-arm using link means attached at pivot points on both the wheel retainers and the cross-arm by pins about which the link means may rotate; and (b) means for extending the wheel retainers by rotating the link means about the pivot points, so that the wheel retainers are prevented from entering a space occupied by the vehicle's tires, wherein the wheel retainers when extended are substantially parallel to the cross-arm and positioned behind the vehicle's tires at a distance from the cross-arm so that the tires are retained therebetween, and for retracting the wheel retainers by rotating the link means about the pivot points, so that the wheel retainers when retracted are in a folded position substantially parallel to and nestled compactly against and adjacent the cross-arm, and wherein the wheel retainers are in substantially the same parallel orientation with respect to the cross-arm when in both the extended and retracted positions.

* * * * *

UNITED STATES PATENT AND TRADEMARK OFFICE
CERTIFICATE OF CORRECTION

PATENT NO. : 5,350,271

DATED : September 27, 1994

INVENTOR(S) : Peter J. Weller

It is certified that error appears in the above-identified patent and that said Letters Patent is hereby corrected as shown below:

Column 2, line 56, After "system" insert --is--.

Column 7, line 62, After "parallel", "tot he" should read --to the--.

Signed and Sealed this

Tenth Day of January, 1995

Attest:

BRUCE LEHMAN

Attesting Officer

Commissioner of Patents and Trademarks